L. L. OIE.
VALVE.
APPLICATION FILED MAY 14, 1912.

1,065,466.

Patented June 24, 1913.

UNITED STATES PATENT OFFICE.

LARS L. OIE, OF SAN PEDRO, CALIFORNIA.

VALVE.

1,065,466.  Specification of Letters Patent.  Patented June 24, 1913.

Application filed May 14, 1912. Serial No. 697,320.

*To all whom it may concern:*

Be it known that I, LARS L. OIE, a subject of the King of Norway, residing at San Pedro, in the county of Los Angeles and State of California, have invented a new and useful Valve, of which the following is a specification.

This invention relates to valves for controlling the outflow of fluid for tanks or other supply means containing fluid at high pressure.

The invention is particularly applicable in connection with valves for controlling the outflow of gas from acetylene tanks. In this connection, in some cases a main valve has been provided for shutting off the supply from the tank and a regulating valve for controlling the supply when the main valve is open, such regulating valve being coupled to the main valve by a union.

The main object of the present invention in this connection is to provide a regulating valve of such construction that the couplings used for connecting the regulating valve to the main valve or high pressure supply are not subjected to the high pressure of the fluid in the tank or supply means, but only to the much lower pressure on the low pressure side of the regulating valve.

A further object of the invention is to provide a valve which will be simple in construction, convenient to assemble, and effective in operation.

Other objects of the invention will appear hereinafter.

Figure 2:
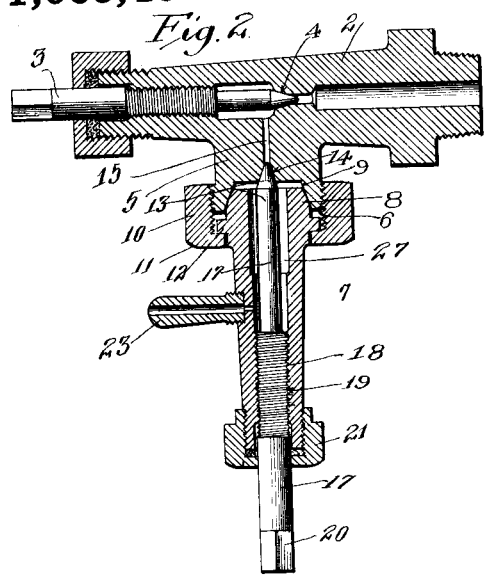
Figure 3:
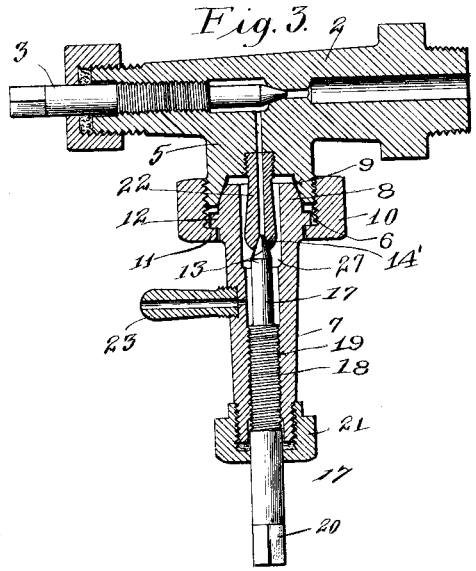
Figure 1:
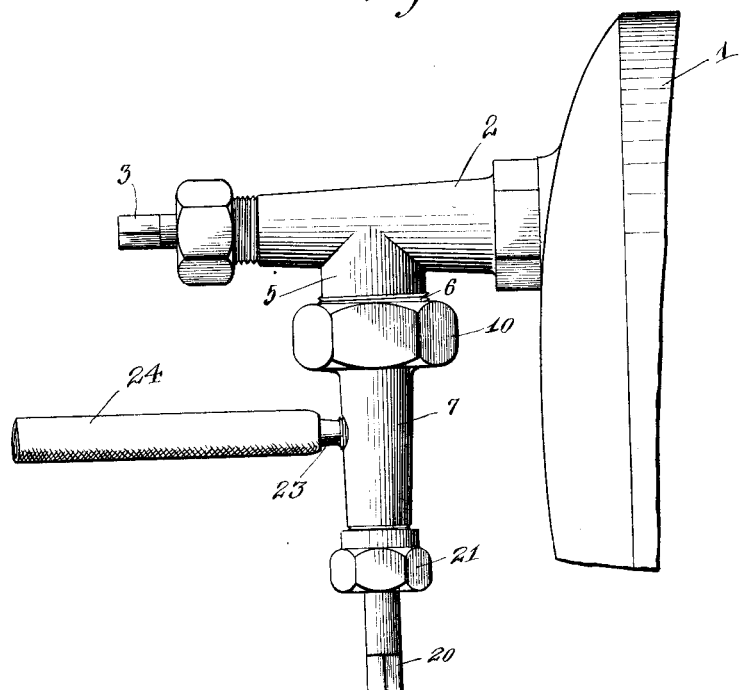

The accompanying drawings illustrate embodiments of the invention, and referring thereto: Figure 1 is a side elevation of the valve. Fig. 2 is a vertical section of one form of the valve. Fig. 3 is a vertical section of another form of the valve.

Referring to Fig. 1, 1 designates a high pressure tank for containing, for example, acetylene gas, 2 a main valve body connected to said tank, 3 the main valve plug coöperating with a seat 4, see Fig. 2, for shutting off the supply from said tank, and 5 an outlet means for said main valve body, said outlet means being in the form of a tubular projection from the body 2 and being threaded as at 6 to receive the union for the regulating valve, an outlet passage 15 being provided in this means 5 for passage of fluid to the regulating valve as hereinafter set forth.

The regulating valve comprises a body 7 provided with an interior valve chamber 27 with a lateral outlet member or nipple 23, and having a tapering inner end portion 8 preferably convexly rounded to fit a flaring recess 9 of the outlet member 5 of the main valve and being held on such member by a screw-ring coupling or union 10 which screws on the screw-threaded portion 6 aforesaid, and is provided with an annular flange 11 engaging with an annular flange 12 on the regulating valve body 7. The regulating valve plug 13 is formed as a conical member coöperating with a valve seat 14 formed at the outer end of the outlet passage 15 aforesaid, said valve plug being carried by a stem 17 which has a screw-threaded portion 18 screwing in a screw-threaded bore 19 in the valve body 7, said valve stem being provided with a squared portion 20 at its outer end for receiving an operating wrench or handle. A stuffing box 21 screws onto the outer end of the valve body 7.

The seat with which the regulating valve plug engages, may be directly on the outlet member 5 as shown at 14 in Fig. 2, or as shown at 14' in Fig. 3, said seat may be on a nipple 22 which is screwed into or otherwise secured to the said member 5 and projects within and beyond the flaring recess 9. In this case, the valve plug, shown at 13 will be short as shown in Fig. 3. By this construction the invention is rendered applicable to tank valves which are provided with nipples for connection of a flexible tube, the union being screwed over the outlet member for the valve without disturbing the nipple, and the nipple being utilized as a seat for the regulating valve.

The operation is as follows: Assuming that the valve 13 is being used to regulate the flow of gas from an acetylene tank to the lamps of an automobile, the pipe, indicated at 24 connecting with the lamps, is slipped onto the lateral outlet member 23 for the regulating valve, the main valve 3 is opened and the regulating valve 13 is turned so as to regulate properly, the gas flowing from the outlet passage 15, so as to provide a proper supply for the light. It will be understood that the acetylene gas in the tank is under a high pressure and the lights require only a very small fraction of this pressure so that it is necessary to adjust the regulating valve so that the pressure of the gas will be greatly reduced in passing through said valve, the coupling 10 for the regulating valve being subjected only to the pressure on the lower side of said regulating valve, there is no liability of objectionable leakage through said coupling, there being free outlet from the regulating valve through the outlet member 23 and flexible tube 24 and the lamps, so that no pressure can accumulate in valve chamber 27 in the regulating valve body. The convexly tapered end portion 8 of the valve body 7 engages with the conically flaring wall of recess 9, along a line of contact, this construction enabling a tighter closure than when two conical faces are used for the contact.

What I claim is:

1. The combination of a main valve body formed as an integral member with an inlet and with an outlet passage, a main valve plug controlling communication from said inlet to said outlet passage, said main valve body being provided at the outer end of said outlet passage with a recess having a tapering wall, and with a tapering valve seat in the center of said recess, a regulating valve body having an end portion seating against said tapering wall at the outer end of said outlet passage, a screw ring engaging said regulating valve body and screwing on said screw thread on the main valve body, and a valve plug movably mounted in said regulating valve body and seating on said seat at the outer end of said outlet passage, said regulating valve body having an outlet and said regulating valve plug controlling communication from the outlet passage for the main valve body to the outlet for the regulating valve body.

2. The combination of a main valve body formed as an integral member with an inlet and with an outlet passage, a main valve plug controlling communication from said inlet to said outlet passage, said main valve body being provided at the outer end of said outlet passage with a recess having a tapering wall, and with a tapering valve seat in the center of said recess, a regulating valve body having an end portion seating against said tapering wall at the outer end of said outlet passage, a screw ring engaging said regulating valve body and screwing on said screw thread on the main valve body, and a valve plug movably mounted in said regulating valve body and seating on said seat at the outer end of said outlet passage, said regulating valve body having an outlet and said regulating valve plug controlling communication from the outlet passage for the main valve body to the outlet for the regulating valve body, said regulating valve body having a recess and said main valve body having a nipple containing the outlet passage aforesaid and extending within said recess in the regulating valve body, and the aforesaid seat for the outlet passage being at the outer end of said nipple.

3. The combination of a main valve body formed as an integral member with an inlet and with an outlet passage, a main valve plug controlling communication from said inlet to said outlet passage, said main valve body being provided at the outer end of said outlet passage with a recess having a tapering wall, and with a tapering valve seat in the center of said recess, a regulating valve body having a convexly, curved, tapering end portion seating against said tapering wall at the outer end of said outlet passage, a screw ring engaging said regulating valve body and screwing on said screw thread on the main valve body, and a valve plug movably mounted in said regulating valve body and seating on said seat at the outer end of said outlet passage, said regulating valve body having an outlet and said regulating valve plug controlling communication from the outlet passage for the main valve body to the outlet for the regulating valve body.

In testimony whereof, I have hereunto set my hand.

LARS L. OIE.

In presence of—
 MARY E. BLASDEL,
 MARTHA M. LANGE.

Copies of this patent may be obtained for five cents each, by addressing the "Commissioner of Patents, Washington, D. C."